United States Patent
Chen et al.

(10) Patent No.: US 9,951,975 B2
(45) Date of Patent: Apr. 24, 2018

(54) CARBON DIOXIDE REFRIGERANT VAPOR COMPRESSION SYSTEM

(75) Inventors: Yu H. Chen, Manlius, NY (US); Suresh Duraisamy, Liverpool, NY (US); Lucy Yi Liu, Fayetteville, NY (US); Jason Scarcella, Cicero, NY (US); Zvonko Asprovski, Liverpool, NY (US); Kursten Lamendola, Chittenango, NY (US); Biswajit Mitra, Huntersville, NC (US)

(73) Assignee: CARRIER CORPORATION, Farmington, CT (US)

( * ) Notice: Subject to any disclaimer, the term of this patent is extended or adjusted under 35 U.S.C. 154(b) by 1216 days.

(21) Appl. No.: 12/863,060

(22) PCT Filed: Jan. 17, 2008

(86) PCT No.: PCT/US2008/051319
§ 371 (c)(1),
(2), (4) Date: Feb. 25, 2011

(87) PCT Pub. No.: WO2009/091400
PCT Pub. Date: Jul. 23, 2009

(65) Prior Publication Data
US 2011/0138825 A1 Jun. 16, 2011

(51) Int. Cl.
*F25B 1/00* (2006.01)
*F25B 9/00* (2006.01)
(Continued)

(52) U.S. Cl.
CPC ............... *F25B 9/008* (2013.01); *F25B 1/10* (2013.01); *F25B 49/02* (2013.01);
(Continued)

(58) Field of Classification Search
CPC .. F25B 9/008; F25B 49/02; F25B 1/10; F25B 2700/1931
(Continued)

(56) References Cited

U.S. PATENT DOCUMENTS 4,938,029 A * 7/1990 Shaw ............................. 62/117
5,062,274 A * 11/1991 Shaw ............................. 62/117
(Continued)

FOREIGN PATENT DOCUMENTS

EP 0921364 A2 6/1999
EP 1577622 A2 9/2005
(Continued)

OTHER PUBLICATIONS

International Search Report and Written Opinion dated Jul. 11, 2008 (9 pgs.).
(Continued)

*Primary Examiner* — Larry Furdge
(74) *Attorney, Agent, or Firm* — Cantor Colburn LLP

(57) ABSTRACT

A carbon dioxide refrigerant vapor compression system and method of operating that system are provided. The refrigerant vapor compression system includes a compression device, a flash tank receiver disposed in the refrigerant circuit intermediate a refrigerant heat rejection heat exchanger and a refrigerant heat absorption heat exchanger, and a compressor unload circuit including a refrigerant line establishing refrigerant flow communication between an intermediate pressure stage of the compression device and the refrigerant circuit at a location downstream of the refrigerant heat absorption heat exchanger and upstream of a suction inlet to the compression device, and a unload circuit flow control device disposed in said unload circuit refrigerant line. In response to at least one system operating parameter sensed by at least one sensor, the controller
(Continued)

selectively positions the unload flow control device to maintain the refrigerant vapor compression system operating below a preselected high pressure limit.

8 Claims, 1 Drawing Sheet

(51) Int. Cl.
 *F25B 1/10* (2006.01)
 *F25B 49/02* (2006.01)
(52) U.S. Cl.
 CPC ..... *F25B 2309/061* (2013.01); *F25B 2400/01* (2013.01); *F25B 2400/16* (2013.01); *F25B 2600/0253* (2013.01); *F25B 2600/0261* (2013.01); *F25B 2600/2501* (2013.01); *F25B 2600/2513* (2013.01); *F25B 2700/193* (2013.01); *F25B 2700/1931* (2013.01); *F25B 2700/1933* (2013.01); *F25B 2700/2115* (2013.01); *F25B 2700/21151* (2013.01); *F25B 2700/21152* (2013.01); *F25B 2700/21161* (2013.01); *F25B 2700/21173* (2013.01); *F25B 2700/21175* (2013.01); *Y02B 30/741* (2013.01)
(58) Field of Classification Search
 USPC ............ 62/115, 228.3, 228.5, 238.6, 510
 See application file for complete search history.

(56) References Cited

U.S. PATENT DOCUMENTS

| | | | |
|---|---|---|---|
| 5,174,123 A | 12/1992 | Erickson | |
| 6,027,031 A * | 2/2000 | Reason | B60H 1/3232 165/291 |
| 6,047,556 A | 4/2000 | Lifson | |
| 6,058,727 A | 5/2000 | Fraser, Jr. et al. | |
| 6,385,980 B1 | 5/2002 | Sienel | |
| 6,711,911 B1 * | 3/2004 | Grabon et al. ............ 62/225 |
| 6,751,966 B2 * | 6/2004 | Viegas et al. ............ 62/131 |
| 7,096,679 B2 | 8/2006 | Manole | |
| 7,257,957 B2 | 8/2007 | Lifson et al. | |
| 7,320,228 B2 * | 1/2008 | Kamimura et al. ........ 62/498 |
| 2003/0209032 A1 * | 11/2003 | Ohta ........................ 62/500 |
| 2005/0132729 A1 | 6/2005 | Manole | |
| 2005/0150248 A1 | 7/2005 | Manole | |
| 2006/0277932 A1 * | 12/2006 | Otake et al. ............ 62/196.1 |
| 2008/0127672 A1 * | 6/2008 | Ducoulombier et al. .... 62/510 |
| 2009/0301109 A1 * | 12/2009 | Manole ...................... 62/79 |

FOREIGN PATENT DOCUMENTS

| | | |
|---|---|---|
| JP | 61107057 A | 5/1986 |
| JP | 3045861 | 2/1991 |
| JP | 05296584 A | 11/1993 |
| JP | H0642845 A | 2/1994 |
| JP | 2001133058 A | 5/2001 |
| JP | 2004227438 | 8/2004 |
| JP | 2004251513 | 9/2004 |
| JP | 2005147511 | 6/2005 |
| JP | 2008002795 | 1/2008 |
| WO | 2007046810 A2 | 4/2007 |
| WO | 2007073379 A1 | 6/2007 |

OTHER PUBLICATIONS

International Preliminary Report on Patentability dated Jul. 20, 2010 (5 pgs.).
European Search Report for application EP 08727839.6, dated Dec. 18, 2014, 6 pages.

* cited by examiner

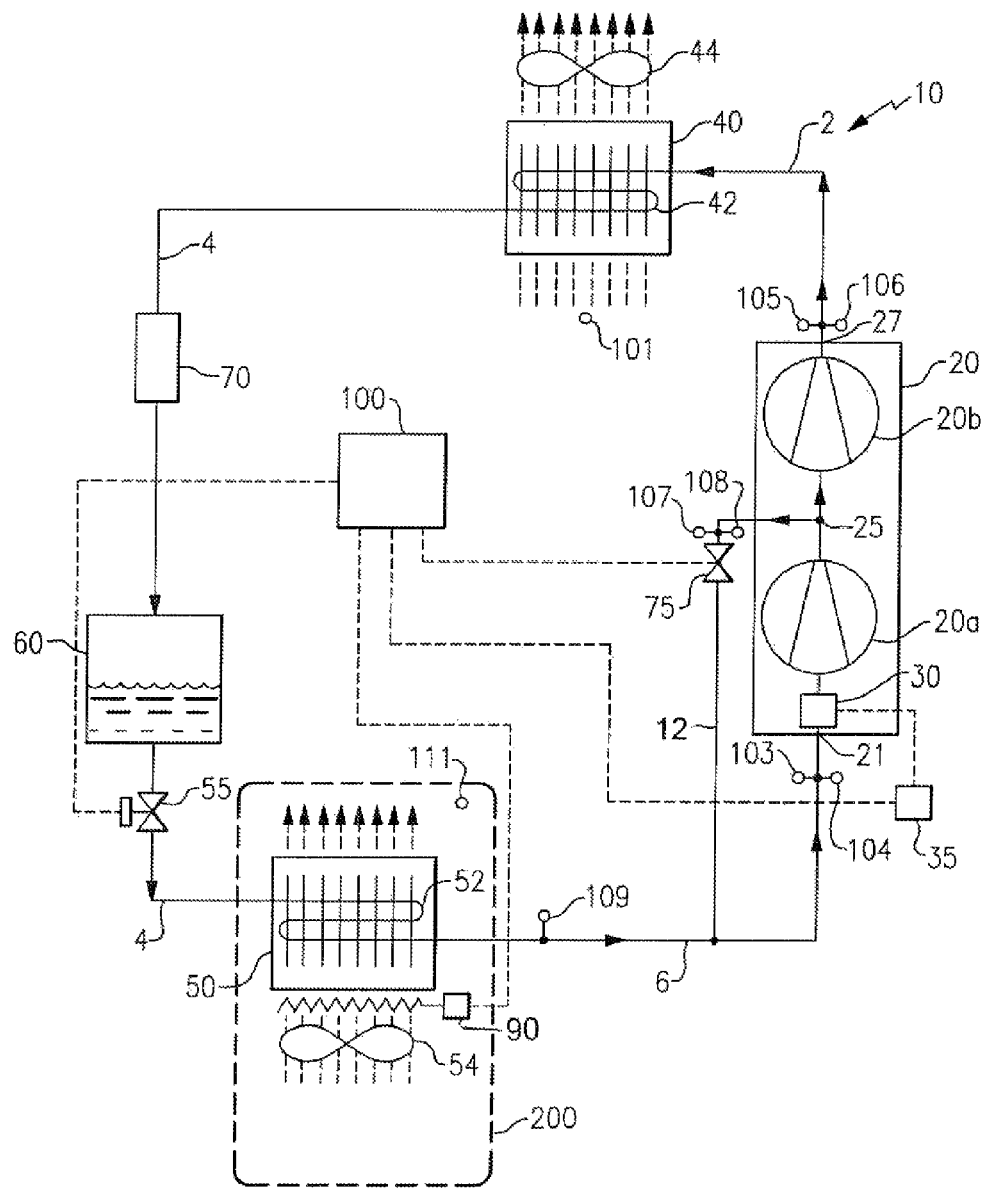

CARBON DIOXIDE REFRIGERANT VAPOR COMPRESSION SYSTEM

FIELD OF THE INVENTION

This invention relates generally to refrigerant vapor compression systems and, more particularly, to a refrigerant vapor compression system using carbon dioxide refrigerant.

BACKGROUND OF THE INVENTION

Refrigerant vapor compression systems are well known in the art and commonly used for conditioning air to be supplied to a climate controlled comfort zone within a residence, office building, hospital, school, restaurant or other facility. Refrigerant vapor compression systems are also commonly used in transport refrigeration systems for refrigerating air supplied to a temperature controlled cargo space of a truck, trailer, container or the like for transporting perishable items. Traditionally, most of these refrigerant vapor compression systems operate at subcritical refrigerant pressures and typically include a compressor, a condenser, and an evaporator, and expansion device, commonly an expansion valve, disposed upstream, with respect to refrigerant flow, of the evaporator and downstream of the condenser. These basic refrigerant system components are interconnected by refrigerant lines in a closed refrigerant circuit, arranged in accord with known refrigerant vapor compression cycles, and operated in the subcritical pressure range for the particular refrigerant in use. Refrigerant vapor compression systems operating in the subcritical range are commonly charged with conventional fluorocarbon refrigerants such as, but not limited to, hydrochlorofluorocarbons (HCFCs), such as R22, and more commonly hydrofluorocarbons (HFCs), such as R134a, R410A and R407C.

In today's market, greater interest is being shown in "natural" refrigerants, such as carbon dioxide, for use in air conditioning and transport refrigeration systems instead of HFC refrigerants. However, because carbon dioxide has a low critical temperature, most refrigerant vapor compression systems charged with carbon dioxide as the refrigerant are designed for operation in the transcritical pressure regime. For example, transport refrigerant vapor compression systems having an air cooled refrigerant heat rejection heat exchanger operating in environments having ambient air temperatures in excess of the critical temperature point of carbon dioxide, 31.1° C. (87.8° F.), must also operate at a compressor discharge pressure in excess of the critical point pressure for carbon dioxide, 7.38 MPa (1070 psia) will operate in a transcritical cycle. In refrigerant vapor compression systems operating in a transcritical cycle, the refrigerant heat rejection heat exchanger operates as a gas cooler rather than a condenser and operates at a refrigerant temperature and pressure in excess of the refrigerant's critical point, while the evaporator operates at a refrigerant temperature and pressure in the subcritical range.

Conventional subcritical refrigerant vapor compression systems charged with conventional fluorocarbon refrigerants may also include a receiver disposed in the refrigerant circuit downstream of the condenser and upstream of the expansion device. Liquid refrigerant from the condenser enters the receiver tank and settles to the bottom of the tank. As this liquid will be at saturated temperature, refrigerant vapor will fill the space in the tank not filled by liquid refrigerant. Liquid refrigerant is metered out of the receiver tank by the expansion valve which controls refrigerant flow to the evaporator. As the operating conditions of the subcritical refrigerant vapor compression system change, the charge requirements for the system will change and the liquid level in the receiver tank will rise or fall, as appropriate, to establish a new equilibrium liquid level.

U.S. Pat. No. 5,174,123 discloses a subcritical refrigerant vapor compression system for transport refrigeration applications that includes a compressor, a condenser, and an evaporator, with a flash tank disposed between the compressor and the evaporator. Refrigerant flows into the flash tank from the condenser at saturated conditions. The flow of refrigerant into the flash tank is controlled by selectively opening or closing a sub-cooling valve to maintain a desired degree of sub-cooling. The flow of liquid refrigerant out of the flash tank to the evaporator is controlled by a suction superheat thermostatic expansion valve. Refrigerant vapor collecting in the flash tank above the liquid refrigerant therein is returned to the compressor, being injected into an intermediate pressure stage of the compressor.

In a transcritical refrigerant vapor compression system, however, controlling the system refrigerant charge is more complex because the compressor high side refrigerant leaving the gas cooler is above the refrigerant's critical point and there is no distinct liquid or vapor phase and thus the charge present in the receiver becomes a function of temperature and pressure which may not respond in a desirable manner to system charge requirements. U.S. Pat. No. 6,385,980 discloses a transcritical refrigerant vapor compression system including a flash tank disposed between a gas cooler and an evaporator and a controller regulating valves in response to the sensed refrigerant pressure in the gas cooler to control the amount of charge in the flash tank to regulate the refrigerant pressure in the gas cooler. The flow of supercritical refrigerant from the gas cooler into the flash tank is controlled by regulating an in-line expansion valve on the entry side of the flash tank and the flow of liquid refrigerant from the flash tank to the evaporator is controlled by an in-line expansion valve on the exit side of the flash tank. Refrigerant vapor collecting in the flash tank above the refrigerant liquid therein is returned to an intermediate pressure stage of the compression device. Thus, the flash tank functions both as an economizer and a refrigerant charge control device.

SUMMARY OF THE INVENTION

In an aspect of the invention, a carbon dioxide refrigerant vapor compression system includes a refrigerant circuit having a refrigerant compression device, a refrigerant heat rejection heat exchanger for passing refrigerant received from the compression device at a high pressure in heat exchange relationship with a cooling medium, a refrigerant heating heat exchanger for passing refrigerant at a low pressure refrigerant in heat exchange relationship with a heating medium, and an expansion device disposed in the refrigerant circuit downstream of the refrigerant cooling heat exchanger and upstream of the refrigerant heating heat exchanger. A flash tank receiver is disposed in the refrigerant circuit downstream of the refrigerant heat rejection heat exchanger and upstream of the expansion device. Additionally, the refrigerant vapor compression system includes a compressor unload circuit having a refrigerant line establishing refrigerant flow communication between an intermediate pressure stage of the compression device and the refrigerant circuit at a location downstream of the refrigerant heat absorption heat exchanger and upstream of a suction inlet to the compression device, and a unload circuit flow control device disposed in the unload circuit refrigerant line.

A controller is provided in operative association with the expansion device and the unload circuit flow control valve. The controller operates in response to at least one system operating parameter sensed by at least one sensor to selectively position the unload flow control device to maintain the refrigerant vapor compression system operating at a discharge pressure below a preselected upper limit pressure. In an embodiment, the sensed operating parameter may, for example, be the refrigerant discharge pressure or the refrigerant discharge temperature.

In an aspect of the invention, a method is provided for controlling operation of a carbon dioxide refrigerant vapor compression system including a refrigerant compression device, a refrigerant heat rejection heat exchanger, a flash tank receiver, an expansion device, and a refrigerant heat absorption heat exchanger disposed in series flow arrangement in the refrigerant circuit. The method comprises the steps of: providing a compressor unload circuit including a refrigerant line establishing refrigerant flow communication between an intermediate pressure stage of the compression device and the refrigerant circuit at a location downstream of the refrigerant heat absorption heat exchanger and upstream of a suction inlet to said compression device, and a unload circuit flow control device disposed in the unload circuit refrigerant line; sensing at least one operating parameter of the refrigerant at least one point in the refrigerant circuit; modulating the expansion device to selectively meter liquid refrigerant flow from the flash tank receiver to the refrigerant heat absorption heat exchanger; and positioning the unload circuit flow control device, in response to the at least one sensed operating parameter, between an open position whereat refrigerant passes through the unload circuit refrigerant line from an intermediate pressure stage of the compression process to suction pressure and a closed position whereat refrigerant flow through the unload circuit refrigerant line is blocked to maintain the refrigerant vapor compression system operating at a discharge pressure below a preselected upper limit pressure. In an embodiment, the sensed operating parameter may, for example, be the refrigerant discharge pressure or the refrigerant discharge temperature.

BRIEF DESCRIPTION OF THE DRAWINGS

For a further understanding of the invention, reference will be made to the following detailed description of the invention which is to be read in connection with the accompanying drawing, where:

FIG. 1 is a schematic diagram illustrating an exemplary embodiment of a refrigerant vapor compression system in accord with the invention.

DETAILED DESCRIPTION OF THE INVENTION

Referring now to FIG. 1, the refrigerant vapor compression system 10 includes a compression device 20 driven by a motor 30 operatively associated therewith, a refrigerant heat rejecting heat exchanger 40, a refrigerant heat absorbing heat exchanger 50, also referred to herein as an evaporator, connected in a closed loop refrigerant circuit in series refrigerant flow arrangement by various refrigerant lines 2, 4 and 6. Additionally, the refrigerant vapor compression system 10 includes a flash tank receiver 60 disposed in refrigerant line 4 of the refrigerant circuit downstream with respect to refrigerant flow of the refrigerant heat rejecting heat exchanger 40 and upstream with respect to refrigerant flow of the evaporator 50, and an evaporator expansion device 55, operatively associated with the evaporator 50, disposed in refrigerant line 4 downstream with respect to refrigerant flow of the flash tank receiver 60 and upstream with respect to refrigerant flow of the evaporator 50. A filter/drier 70 may also be disposed in refrigerant line of the refrigerant circuit downstream with respect to refrigerant flow of the refrigerant heat rejecting heat exchanger 40 and upstream with respect to refrigerant flow of the flash tank receiver 60.

The compression device 20 functions to compress and circulate refrigerant through the refrigerant circuit as will be discussed in further detail hereinafter. The compression device 20 may be a single multi-stage compressor having at least a first low pressure compression stage 20a and a second high pressure compression stage 20b, such as a reciprocating compressor, as illustrated in FIG. 1, wherein partially compressed refrigerant from the first compression stage 20a passes to the second compression stage 20b internally within the compression mechanism of the multiple stage compressor 20. It is to be understood, however, that in another embodiment, the compression device 20 may comprise a pair of compressors 20a and 20b, such as for example a pair of reciprocating compressors, having a refrigerant line connecting the discharge outlet port of the first compressor 20a in refrigerant flow communication with the suction inlet port of the second compressor 20b. In the case of a single multiple stage compressor, each compression stage would be driven by a single motor 30 operatively associated in driving relationship with the compression mechanism of the compressor 20. In the case of a pair of compressors constituting the compression device 20, each compressor will be driven independently of the other by its own dedicated motor operatively associated in driving relationship with its compression mechanism.

The refrigerant vapor compression system 10 further includes a compressor unload circuit comprising a refrigerant line 12 that interconnects an intermediate pressure point in the compression process with refrigerant line 6 of the refrigerant circuit of a point downstream with respect to refrigerant flow of the evaporator 50 and upstream with respect to refrigerant flow of the suction inlet 21 of the compression device 20, and an unload circuit flow control device 75 disposed in the refrigerant line 12 that is operative to control the flow of refrigerant through the refrigerant line 12 of the compressor unload circuit. In the exemplary embodiment of the refrigerant vapor compression system depicted in FIG. 1 wherein the compression device 20 is a single compressor having at least a low pressure compression stage 20a and a high pressure compression stage 20b, refrigerant line 12 of the compressor unload circuit taps into the compression device 20 at a location 25 opening into an intermediate pressure point of the compression process, that is at a refrigerant pressure higher than the refrigerant pressure at the suction inlet to the compression device 20 and lower than the refrigerant pressure at the discharge outlet 27 of the compression device 20, and taps into the refrigerant line 6 at suction pressure.

When the refrigerant vapor compression system 10 is operating in a subcritical cycle, the refrigerant heat rejecting heat exchanger 40 functions as a refrigerant condensing heat exchanger through which hot, high pressure refrigerant vapor discharging from the compression device 20 passes in heat exchange relationship with a cooling medium to condense the refrigerant passing therethrough from a refrigerant vapor to refrigerant liquid. The refrigerant condensing heat exchanger 40 may comprise a finned tube heat exchanger 42, such as for example, a fin and round tube heat exchange coil or a fin and flat mini-channel tube heat exchanger. In transport refrigeration system applications, the cooling medium may be ambient air passed through the condenser 40 in heat exchange relationship with the refrigerant by means of fan(s) 44 operatively associated with the condenser 40, or other cooling fluid, such as water.

The evaporator 50 constitutes a refrigerant evaporating heat exchanger, such as a conventional finned tube heat exchanger 52, such as for example a fin and round tube heat exchange coil or a fin and mini-channel flat tube heat exchanger, through which expanded refrigerant having traversed the expansion device 55 passes in heat exchange relationship with a heating fluid, whereby the refrigerant is vaporized and typically superheated. The heating fluid passed in heat exchange relationship with the refrigerant in the evaporator 50 may be air passed through the evaporator 50 by means of fan(s) 54 operatively associated with the evaporator 50, to be cooled and commonly also dehumidified, and thence supplied to a climate controlled environment 200 such as, for example, a perishable cargo, such as for example refrigerated or frozen food items, storage zone associated with a transport refrigeration system.

The refrigerant vapor compression system 10 may also include a control system including a controller 100 operatively associated with a plurality of flow control devices interdisposed in various refrigerant lines. In addition to monitoring ambient temperature via a temperature sensor 101 disposed in the flow of ambient air entering the refrigerant heat rejection heat exchanger 40, the controller 100 also monitors various system operating parameters by means of various sensors operatively associated with the controller 100 and disposed at selected locations throughout the system. For example, in the exemplary embodiment depicted in FIG. 1, a temperature sensor 103 and a pressure sensor 104 may be provided to sense the refrigerant suction temperature and pressure, respectively, a temperature sensor 105 and a pressure sensor 106 may be provided to sense refrigerant discharge temperature and pressure, respectively, a temperature sensor 107 and a pressure sensor 108 may be provided to sense the temperature and pressure of the refrigerant passing through the refrigerant line 12. A temperature sensor 109 may be provided to sense the temperature of refrigerant leaving the refrigerant heat absorbing heat exchanger, i.e. evaporator 50, for monitoring the degree of superheat possessed by the refrigerant vapor leaving the evaporator 50. The pressure sensors 104, 106, 108 may be conventional pressure sensors, such as for example, pressure transducers, and the temperature sensors 103, 105, 107 and 109 may be conventional temperature sensors, such as for example, thermocouples or thermistors.

The controller 100 controls operation of the compression device 20 through control of the compressor drive motor 30 operatively associated with the compression device 20, as well as operation of the fans 44 and 54, through control of the respective motors (not shown) operatively associated therewith. Further, the controller 100 modulates the electronic expansion valve 55 to control the flow of refrigerant through refrigerant line 4 into the evaporator 50 and selectively opens or closes the unload circuit flow control device 75 to control the flow of refrigerant through refrigerant line 12. The controller 100 modulates the flow area of the flow passage through the electronic expansion valve 55, in response to the refrigerant temperature sensed by the sensor 109 on the outlet side of the evaporator 50, that is the temperature passing from the evaporator 50 to the suction inlet 21 of the low pressure compression stage 20a of the compression device 20 through refrigerant line 6. The controller 100 selectively opens and closes the unloader circuit control device 75, which comprises a fixed flow area valve, such as for example a fixed orifice solenoid valve, in response to the refrigerant discharge temperature or pressure sensed by sensors 105 or 106, respectively, on the high side of the compression device 20, that is the temperature and pressure of the refrigerant discharged from the high pressure compression stage 20b.

The controller 100 determines the desired mode of operation based upon ambient temperature sensed by sensor 101 and the various sensed system refrigerant temperatures and pressures and then positions the electronic expansion valve 55 and the unload circuit flow control device 75 accordingly. The controller 100 can unload the compression device 20 as necessary to control the refrigeration capacity of the refrigerant vapor compression system 10 by selectively opening or closing the compressor unload circuit valve 75. With the flow control device 75 open, refrigerant vapor flows out of an intermediate stage of the compression process through the compressor unload bypass line 12 into refrigerant line 6, rather than proceeding onward to be further compressed in the high pressure compression stage 20b. The refrigerant vapor passing through the unload circuit refrigerant line 12 returns directly to the suction side of the compression device, thus bypassing the high compression stage 20b and thereby unloading the compression device 20. This unloading of the compressor 20 through the compressor unload circuit flow control device 75 may be implemented in response to a high compressor discharge refrigerant temperature, or for capacity reduction or compressor power reduction.

The compressor drive motor 30 operative associated with the compression mechanism of the compression device 20 may be a fixed-speed motor operating on power from a fixed frequency power source or a variable-speed motor operating on variable-frequency power as supplied from an inverter 35 operatively associated with a fixed frequency power source. If the compressor drive motor 30 is a variable-speed motor, the controller 100 can also control the capacity output of the refrigerant vapor compression system 10 by varying the frequency of the power output from the inverter 35 thereby controlling the speed of the compressor drive motor 30.

If at any point in operation there is too much refrigerant charge circulating in the system, the rate of liquid refrigerant entering the flash tank receiver 60 will exceed the rate of refrigerant leaving the flash tank receiver 60 and the liquid level within the flash tank receiver 60 will rise until equilibrium is reached between the rate of liquid entering the flash tank receiver 60 and the rate of liquid leaving the receiver tank 60 with the excess liquid remaining stored in the flash tank receiver 60. If an any point in operation there is too little refrigerant charge circulating in the system, the rate of liquid refrigerant entering the flash tank receiver 60 will be less than the rate of liquid leaving the flash tank receiver 60 and the liquid level within the flash tank receiver 60 will drop as liquid leaves the receiver tank to the refrigerant circuit to circulate therethrough. The liquid level within the flash tank receiver 60 will continue to drop until a new equilibrium is established between the rate of liquid entering the flash tank receiver 60 and the rate of liquid leaving the flash tank receiver 60.

As noted previously, the refrigerant vapor compression system 10 specifically adapted for operation with carbon dioxide as the refrigerant. The controller 100, through selective modulation of the electronic expansion valve 55 and selective opening and closing of the compressor unload circuit flow control valve 75, will endeavor to maintain the refrigerant discharge pressure, monitored by pressure sensor 106, at a pressure below a desired limit For example, the desired limit may be set at the critical point pressure for carbon dioxide of 7.38 MPa (73.8 bars or 1070 psia) so that at all points to the refrigerant cycle, the refrigerant vapor compression system 10 is operating in a subcritical cycle. Maintaining the compressor discharge pressure below the critical point pressure for carbon dioxide will ensure that the refrigerant discharge temperature also lies below the critical point temperature for carbon dioxide of 31.1° C. (87.8° F.).

In such environments, it is possible that the ambient air temperature may drop, particularly during the winter season, to temperatures so low that that air circulating from the controlled temperature environment may need to actually be heated in order to maintain the desired set point temperature, such as for example in the case of the temperature controlled environment 200 of the cargo space within a transport refrigeration container wherein a specific temperature is to be maintained for the particular perishable items stored therein. Therefore, the refrigerant vapor compression system 10 includes an auxiliary electric heater 90 operatively associated with the evaporator 50, which when activated warms the circulating air upstream with respect to air flow of the evaporator heat exchanger 52. The controller 100 monitors the ambient air temperature sensed by the temperature sensor 101 and the temperature of the air within the controlled environment 200 as sensed by the temperature sensor 111 and activates the electric heater 90 when both the ambient air temperature is lower than the air temperature within the controlled environment 200 and the air temperature within the controlled environment 200 is below the desired set point temperature by a preselected amount. The controller 100 will deactivate the auxiliary heater when the air temperature within the controlled environment 200 is at or above the desired set point temperature or the ambient air temperature exceeds the air temperature within the controlled environment 200.

The controller 100 may be an electronic controller, such as a microprocessor controller, or any other controller of the type conventionally used in connection with controlling the operation of a refrigerant vapor compression system. For example, in transport refrigeration applications, the controller 100 could be a MicroLink™ series microprocessor controller, such as the ML2 model, the ML2i model or ML3 model, available from Carrier Corporation, Syracuse, N.Y., USA. It is to be understood, however, that any controller capable of performing the functions discussed hereinbefore with respect to controller 100 may be used in the refrigerant vapor compression system of the invention and in carrying out the method of the invention.

The foregoing description is only exemplary of the teachings of the invention. Those of ordinary skill in the art will recognize that various modifications and variations may be made to the invention as specifically described herein and equivalents thereof without departing from the spirit and scope of the invention as defined by the following claims.

We claim:

1. A carbon dioxide refrigerant vapor compression system comprising:
   a refrigerant circuit including a refrigerant compression device, a refrigerant heat rejection heat exchanger for passing carbon dioxide refrigerant received from said compression device at a first pressure in heat exchange relationship with a cooling medium, a refrigerant heat absorption heat exchanger for passing carbon dioxide refrigerant at a second pressure lower than the first pressure in heat exchange relationship with a heating medium, and an expansion device disposed in the refrigerant circuit downstream of said refrigerant heat rejection heat exchanger and upstream of said refrigerant heat absorption heat exchanger;
   a flash tank receiver disposed in the refrigerant circuit downstream of said refrigerant heat rejection heat exchanger and upstream of said expansion device;
   a compressor unload circuit including a refrigerant line establishing refrigerant flow communication between an intermediate pressure stage of said compression device and said refrigerant circuit at a location downstream of said refrigerant heat absorption heat exchanger and upstream of a suction inlet to said compression device, and an unload circuit flow control device disposed in said unload circuit refrigerant line; and
   a controller operatively associated with said expansion device and said unload circuit flow control device, said controller operative in response to at least one of refrigerant discharge pressure sensed at an outlet of the refrigerant compression device and refrigerant discharge temperature sensed at an outlet of the refrigerant compression device to selectively position the unload circuit flow control device to maintain said refrigerant vapor compression system operating at a discharge pressure below a preselected upper limit, wherein said preselected upper limit is the critical point pressure for carbon dioxide;
   an ambient temperature sensor, the controller operative in response to an ambient temperature to selectively control an operating mode of the vapor compression system.

2. A refrigerant vapor compression system as recited in claim 1 wherein said compression device comprises a single reciprocating compressor having at least two compression stages.

3. A refrigerant vapor compression system as recited in claim 1 wherein said compression device comprises at least two reciprocating compressors disposed in the refrigerant circuit in a series relationship with respect to refrigerant flow.

4. A refrigerant vapor compression system as recited in claim 1 wherein the heating medium comprises air circulated through the refrigerant heat absorption heat exchanger from a controlled temperature environment.

5. A refrigerant vapor compression system as recited in claim 1 wherein the heating medium comprises air circulated through the refrigerant heat absorption heat exchanger from a temperature controlled perishable cargo storage zone.

6. A method for controlling operation of a carbon dioxide refrigerant vapor compression system including a refrigerant compression device, a refrigerant heat rejection heat exchanger, a flash tank receiver, an expansion device, and a refrigerant heat absorption heat exchanger disposed in series flow arrangement in the refrigerant circuit, said method comprising:
   providing a compressor unload circuit including a refrigerant line establishing refrigerant flow communication between an intermediate pressure stage of said compression device and said refrigerant circuit at a location downstream of said refrigerant heat absorption heat exchanger and upstream of a suction inlet to said compression device, and an unload circuit flow control device disposed in said unload circuit refrigerant line;
   sensing at least one operating characteristic of the refrigerant at at least one point in the refrigerant circuit;

modulating said expansion device to selectively meter liquid refrigerant flow from said flash tank receiver to said refrigerant heat absorption heat exchanger; and positioning the unload circuit flow control device, in response to at least one of refrigerant discharge pressure sensed at an outlet of the refrigerant compression device and refrigerant discharge temperature sensed at an outlet of the refrigerant compression device, between an open position where at refrigerant passes through the unload circuit refrigerant line from an intermediate pressure stage of the compression device to suction pressure and a closed position whereat refrigerant flow through the unload circuit refrigerant line is blocked; device and refrigerant discharge temperature sensed at an outlet of the refrigerant wherein positioning the unload circuit flow control device between an open position and a closed position comprises selectively positioning the unload circuit flow control device between an open position and a closed position to maintain said refrigerant vapor compression system operating at a discharge pressure below a preselected upper limit, wherein said preselected upper limit is the critical point pressure for carbon dioxide.

7. A refrigerant vapor compression system as recited in claim 1 wherein said controller is operative in response to the at least one system operating parameter sensed by the at least one sensor to selectively position the expansion device to maintain said refrigerant vapor compression system operating at a discharge pressure below the preselected upper limit.

8. A method as recited in claim 6 wherein modulating said expansion device comprises selectively positioning the expansion device between an open position and a closed position to maintain said refrigerant vapor compression system operating at a discharge pressure below the preselected upper limit.

* * * * *